United States Patent [19]

Lee et al.

[11] Patent Number: 5,012,333
[45] Date of Patent: Apr. 30, 1991

[54] INTERACTIVE DYNAMIC RANGE ADJUSTMENT SYSTEM FOR PRINTING DIGITAL IMAGES

[75] Inventors: Hsien-Che Lee, Penfield; Martin C. Kaplan; Robert M. Goodwin, both of Rochester, all of N.Y.

[73] Assignee: Eastman Kodak Company, Rochester, N.Y.

[21] Appl. No.: 293,838

[22] Filed: Jan. 5, 1989

[51] Int. Cl.$^5$ .................. G03F 3/08; H04N 1/46
[52] U.S. Cl. ........................ 358/80; 358/75; 358/76
[58] Field of Search .............. 358/80, 39, 76, 40, 358/75 IJ, 75, 79, 166

[56] References Cited

U.S. PATENT DOCUMENTS

| | | | |
|---|---|---|---|
| 4,467,364 | 8/1984 | Konagaya | 358/76 |
| 4,812,902 | 3/1989 | Fuchsberger | 358/75 |
| 4,812,903 | 3/1989 | Wagensonner | 358/80 |
| 4,825,297 | 4/1989 | Fuchsberger | 358/75 |
| 4,831,434 | 5/1989 | Fuchsberger | 358/75 |
| 4,899,216 | 2/1990 | Tatsumi | 358/80 |
| 4,933,754 | 6/1990 | Reed et al. | 358/76 |

FOREIGN PATENT DOCUMENTS

| | | | |
|---|---|---|---|
| 0232542 | 1/1985 | Japan | 358/76 |
| 0089174 | 9/1983 | United Kingdom | 358/80 |

Primary Examiner—James J. Groody
Assistant Examiner—Safet Metjahic
Attorney, Agent, or Firm—Edward Dugas

[57] ABSTRACT

An interactive dynamic range adjustment method for printing digital images, and an implementation system, are disclosed. The method is based on experimental findings about visual photoreceptor adaption and human visual contrast sensitivity. The system adjusts the contrast of the low-frequency component only of the image, preserving (or if one wishes, enhancing) the high-frequency image component in its contrast. The adjustment is controlled by a mapping curve which the user manipulates interactively. The simulated optical print image and the dynamic range adjusted image are displayed side by side on a monitor screen so that the user can make proper selection of parameters to achieve the desired effect. For many images, the system automatically computes good parameters and no further adjustment is needed.

7 Claims, 5 Drawing Sheets

INTERACTIVE DYNAMIC RANGE ADJUSTMENT SYSTEM FOR PRINTING DIGITAL IMAGES

TECHNICAL FIELD OF THE INVENTION

The present invention is related to the field of digital image processing and, more particularly, to a system and associated software for interactively adjusting the dynamic rings of digital images prior to printing.

A portion of the disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

BACKGROUND OF THE INVENTION

One of the many surprises to an amateur photographer is the way a back lit scene looks on a photographic print. To the best of his/her recollection, in the original scene there was nothing like the huge brightness difference on the print between the highlight and the shadow on the subject's face. Our visual systems apparently do not process the flat two dimensional photographic print the same way as they do for the three dimensional scene image. For this reason, one has to process the image in a compensatory way before it is printed on paper in order to make it look like the original scene. Another problem with printing an image having a wide dynamic range in luminance on paper is the limitation inherent in any reflection material, that is, the narrow useful dynamic range is limited by flare light.

Since a good camera/film system can easily record a density range of 1.6 with a gamma equal to 0.65, the recorded useful exposure range is about 300:1. However, the density range on a photographic print, over which we can easily see image detail is from 0.12 to 1.8, which gives a luminance range of 50:1. There is more information on the film than can be effectively expressed on the print without some type of dynamic range compression. A common way to deal with this problem is the darkroom burning and dodging operation, which is the process to change the local exposure on paper by moving a piece of opaque material in front of it. This process essentially its surround. It takes skill, patience, and time to produce a good print with such a process.

If one can scan the film image to convert it to digital form, one can do similar types of manipulation faster and with more precise controls with the help of a high speed computer. The present invention is an interactive dynamic range adjustment system with associated software which has been implemented on a workstation with a keyboard and a mouse for user input. For an image with a wide dynamic range, one cannot simply compress the image signal proportionally at every point because, by doing so, the processed image will look very "flat" and visually unacceptable. The basic idea is to separate the image into its low frequency and high frequency components, and only perform the compression on the low frequency component. The invention relies on an understanding of the image processing of the human visual system when it is dealing with a wide dynamic range scene.

The simple analogy that our eye functions like a camera overlooks the enormous image processing going on in the retina and the brain. Not only can the eye adapt to see over a luminance range of at least a billion to one, but it also can give a fairly constant perception of color and brightness despite the large variation in the illumination across the scene.

One of the visual adaptation processes occurs in the photoreceptors. There appear to be two mechanisms that operate during photoreceptor light adaptation, allowing the cell to continue to respond from very dim light to very bright light. First, when receptors are illuminated with continuous light, the membrane potential gradually and partially returns towards dark levels, bringing the receptor below its saturation level and making it capable of responding to brighter light. Secondly, if the steady background light intensity is increased, the receptor intensity response curve shifts to the high intensity range. In FIG. 1, taken from FIG. 7.14c of the Retina: An Approachable Part of the Brain, by J. E. Dowling, Harvard University Press, 1987, the V-log I curves representing the peak responses of gecko photoreceptors are illustrated for a dark adapted state (DA) and first and second background intensities log $I = -4.2$ and $-2.2$. In photographic terms, the receptor essentially changes its film speed according to the background light intensity. If the background light is weak, it uses a high speed film. If the background is very bright, it changes to a very low speed film. However, this is different from photography because the change of film speed occurs locally on the same image, i.e., the retina uses different speed films at different parts of an image. Applying the same idea to printing photographic images, one can change the effective paper speed at different parts of an image by computers. This is the central idea of the present invention.

There are two major questions one has to answer at this moment:

What size is the so called background that the photoreceptors are adapting to?

What characteristic of the background determines the adaptation state? Is it the average irradiance, the average log irradiance, or something else?

To answer the first question, one needs to understand roughly what adaptation does to the original scene irradiance image. Basically, the operation of adaptation is to take something out of the input stimulus, and what is taken out depends on what is being adapted to. If the adaptation is to the average irradiance of the surrounding background, i.e., the average irradiance is used to shift the intensity response curve of the photoreceptor without changing the curve shape, then the effect of adaptation is to reduce the incident light intensity by an amount which is a function f of the average irradiance of the adapting background. If f is a linear function, then the effect of adaptation is effectively a high pass filter. The magnitudes of the low frequency components of the input image are decreased. To be locally adaptive, the background cannot be the whole image. On the other hand, it has to cover a reasonably large area so that the cell will not "adapt out" the very fine image detail. In the extreme case, if a cell can adapt fully to a very tiny spot of light just covering its size, every cell will have an identical response, and there will be no image left. In terms of spatial frequency content, the smaller the area of the adapting background is, the higher the affected frequencies will be. Presumably, the compromise must be made so that the trade off between the visible image detail and the adaptive dynamic range is optimal for the organism's survival. Any optical system is limited by diffraction and aberration on the high spatial frequency end. For visual perception, there is also good reason to be insensitive to the low frequency variation so that slow changes in illumination and surface nonuniformity will not interfere with the perception of a physical object as a whole.

If one assumes that the low frequency response of the human visual system is determined by local adaptation along the visual pathway, including stages beyond the photoreceptor (e.g., lateral inhibition in the neural pathway), then one can get a good measure of how large an equivalent area a receptor cell takes as its adapting background by looking at the data for the human visual contrast sensitivity function (CSF). For a human eye with a 2.5 mm pupil looking at scenes of high luminance, the peak sensitivity is at about 5-8 cycles/degree. At 2.25 cycles per degree the sensitivity is roughly half the peak value. It will be seen later from the data set out in the Description of the Preferred Embodiment that the optimal adapting field size for the dynamic range adjustment of the present system has a close relation to these numbers.

To answer the second question, one has to hypothesize the mechanism in the center and its interaction with the surround along the visual pathway. If the strength of mutual inhibition depends on the output from each of the interacting neurons, and the neuron's response is proportional to the logarithm of the incident light irradiance, then what determines the adaptation is more likely to be the average log irradiance than the average irradiance. The input response function of a neuron or a photoreceptor is usually nonlinear, and it seems that for a relatively large range of input the photoreceptor response is roughly proportional to the logarithm of the input intensity, rather than to the intensity itself. Based on this type of reasoning, the average density of the surround will be used to control the local adaptation in the dynamic range adjustment of the present system. However, it is not clear from a physical or a mathematical point of view whether average density is definitely a better choice than average exposure.

Density space as used in this invention refers to quantities which are linearly proportional to the logarithm of the scene radiance. For example, the characteristic curves of a photographic film are usually expressed as the film density as functions of the logarithm of film exposure. Expressing color values in the density space has the advantage of making the chrominance values independent of the intensity of the scene radiance, because the difference of the logarithms of the two quantities remains unchanged when quantities are multipled by a constant factor. Therefore, we do not have to correct for color changes when the luminance component is adjusted.

SUMMARY OF THE INVENTION

From the above discussion, a dynamic range adjustment method can be presented as follows. A pixel in the input negative image (only the luminance component) is at the center of an N by N block. Its final density on the print will depend on how bright its surround is, which is measured by the weighted average density of its N by N neighboring pixels (including itself). Usually, if its surround is bright, the pixel will be printed darker, meaning that the cell has adapted to the bright surround. The way the pixel is printed darker is to subtract a fraction of the averaged surround density from the pixel's input negative density (this is equivalent to shifting the photoreceptor's intensity response curve to the right). Reducing the pixel's density is equivalent to reducing the pixel's original scene exposure, and when the reduced negative density is finally mapped through the paper D-logH curve, the pixel is printed darker. If the fraction of the averaged surround density subtracted from a pixel is a constant, independent of the averaged density level, then the whole process is essentially unsharp masking, or high pass filtering in density space. This is easily seen from the fact that the weighted averaging process is a low pass filter and, if a constant fraction of the low pass filter image is subtracted from the original image, the result is a high pass filtered version of the input image. The unsharp masking operation has been used under a different name in digital image processing, the homomorphic transform (see, for example, "Image Processing in the Context of a Visual Model," Proc IEEE, Vol. 60, No. 7, pp. 828-842, July 1972) which has been shown to compress the dynamic range of images. The operations of unsharp masking and homomorphic transform differ in their exact filter response shape, because the former is meant to be a sharpening operation, while the latter is a dynamic range compressor.

However, the subtracted fraction need not be a constant. It can and should be a function of the averaged density. It is precisely by controlling the functional shape that one can control where and how much one wants to compress and expand the dynamic range of the printed image. A good way to exercise this type of control is to let the user manipulate this function interactively, looking at the density histogram and the processed image as feedback for adjusting the function parameters.

From the foregoing, it can be seen that it is a primary object of the present invention to provide an interactive dynamic range adjustment system for digital image processing.

It is a further object of the present invention to provide a system for adjusting the contrast of the low frequency component of a digital image.

It is yet another object of the present invention to provide a system wherein an operator interacts to make modifications to a displayed digital image.

Another object of the present invention is to provide a system wherein the modifications may be made separately to the luminance and chrominance components of the digital image.

Yet another object of the present invention is to provide a system incorporating unique software for displaying an original digital image next to a dynamic range adjusted image, for permitting an operator to observe selected modifications.

These and other objects of the present invention will become more apparent when taken in conjunction with the following description and drawings wherein like characters indicate like parts, and which drawings form a part of this application.

DESCRIPTION OF THE PREFERRED EMBODIMENTS

Figure 1:
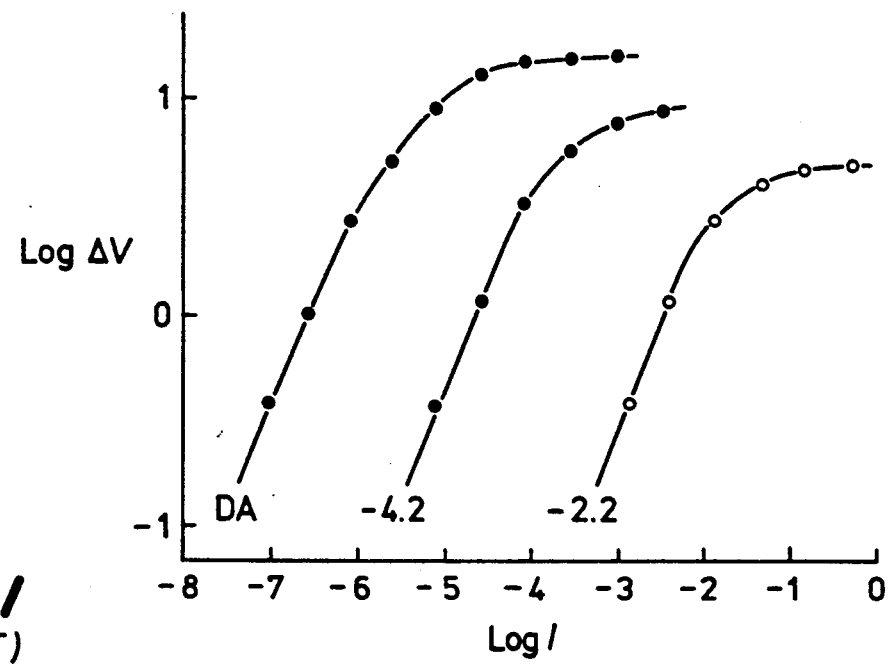
FIG. 1 is a prior art chart illustrating curves for the peak responses of gecko photoreceptors plotted on log-log coordinates.
Figure 2:
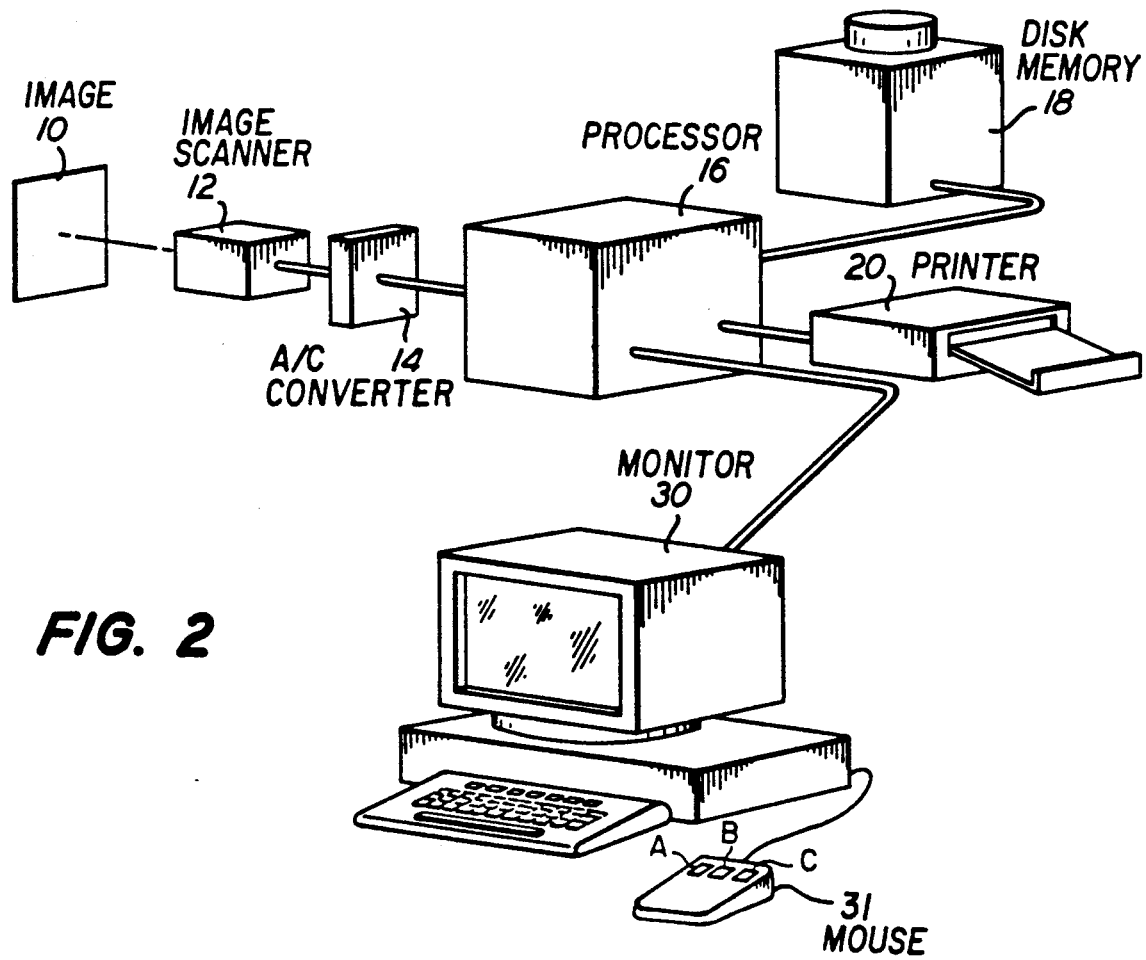
FIG. 2 is a block perspective diagram of a system for implementing the present invention.

A basic system of an interactive image processor on which the present invention is implemented is illustrated in FIG. 2. The basic components of such a system are an image scanner 12 for converting an image 10 into electrical signals which may be analog or digital in nature. If analog signals are outputted by the image scanner 12, an analog to digital converter 14 is used to provide digital signals which are used by a processor 16. The processor contains memory, ALU, temporary registers and control circuitry for operating the processor under software and user control. Expanded memory is provided with a disk memory 18. A high resolution terminal 30 provides the user with visual information and a keyboard through which user information is directed to the basic system. Additional inputting devices can supplement the user keyboard. These devices may be, for example, a mouse 31 having activating buttons A, B and C, light pen and pad or joy-stick (not shown) for controlling a cursor.

A printer 20 is connected to the processor 16 and to the terminal 30 for receiving a processed digital image from the processor and for printing a hard copy of the image.

Figure 3:
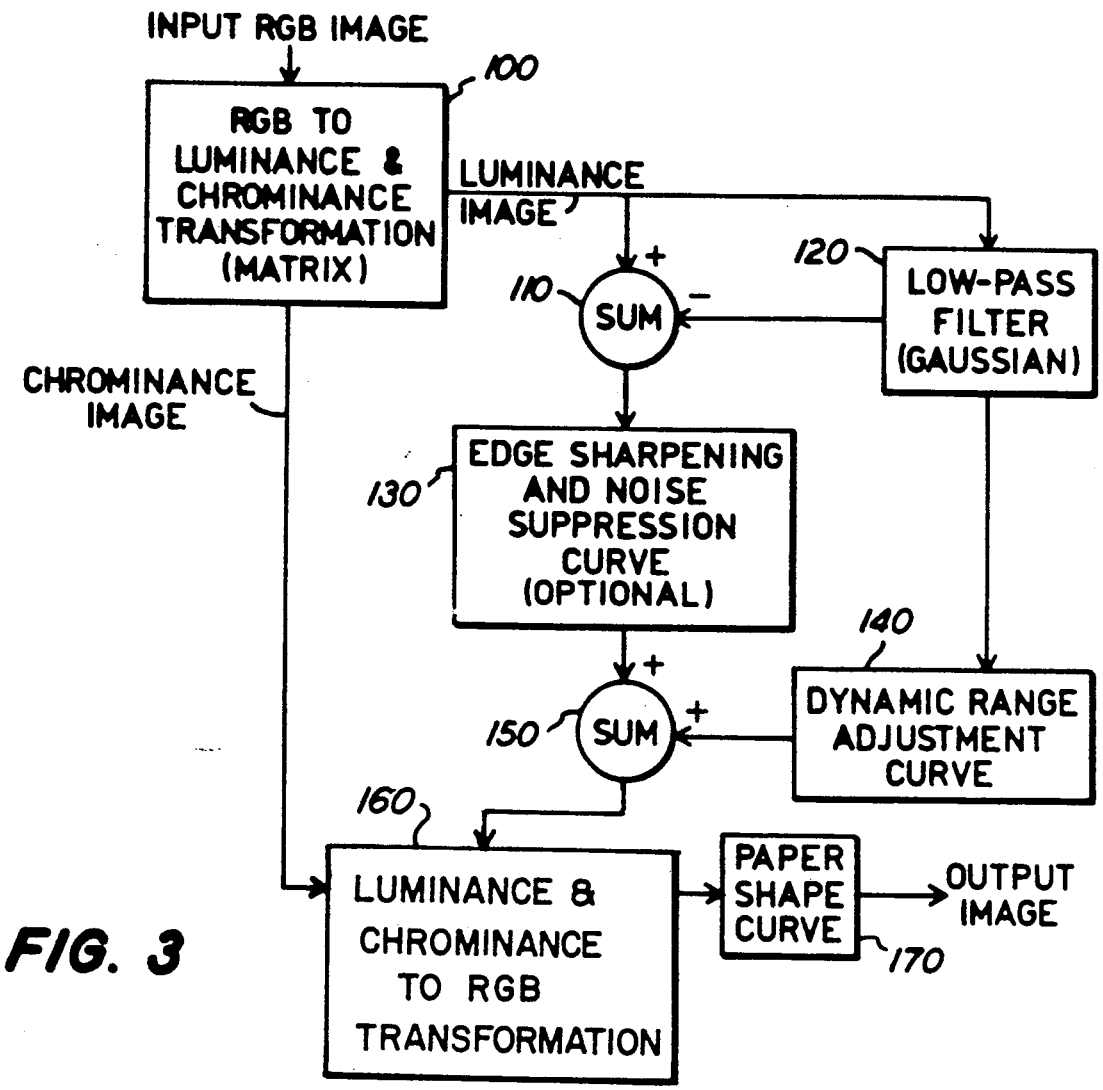
FIG. 3 is a block diagram illustrating the function blocks of one embodiment of the present invention.

Referring to FIG. 3, digital signals representing an input R,G,B image are directed to an R, G, B to luminance and chrominance transformation matrix 100 wherein signals corresponding to a luminance image and a chrominance image are generated and appear at two different outputs. The luminance image signals are directed to the + input of a summing circuit 110 and to a low pass (Gaussian) filter 120. The filter 120 provides a first output to a − input of the summing circuit 110 and a second output to a dynamic range adjustment curve block 140. The summer 110 provides at its output a difference signal which is the difference between the luminance image signal and the low pass filtered luminance signal. The difference signal is directed to an optional edge sharpening and noise suppression block 130 which may be used to provide a curve for modifying the high frequency component of the difference signal. The output from block 130 is directed to one + input of a summing circuit 150 and the output of block 140 is directed to a second + input of the summing circuit 150. The summing circuit combines the two signals on its inputs and provides the combined signals to an input of a luminance and chrominance to R,G,B transformation block 160. The transformation block 160 also receives the chrominance signals from block 100 at another input and transforms and combines the two signals to provide an R,G,B signal to a paper shape curve block 170. The paper shape curve block 170 functions to modify the R,G,B signals from transformation block 160 by the characteristics of the paper upon which the image is to be printed. The output image signals are then directed to the printer 20 for printing.

The chrominance image may also be processed in a manner similar to the luminance image as illustrated in FIG. 3.

Figure 7:
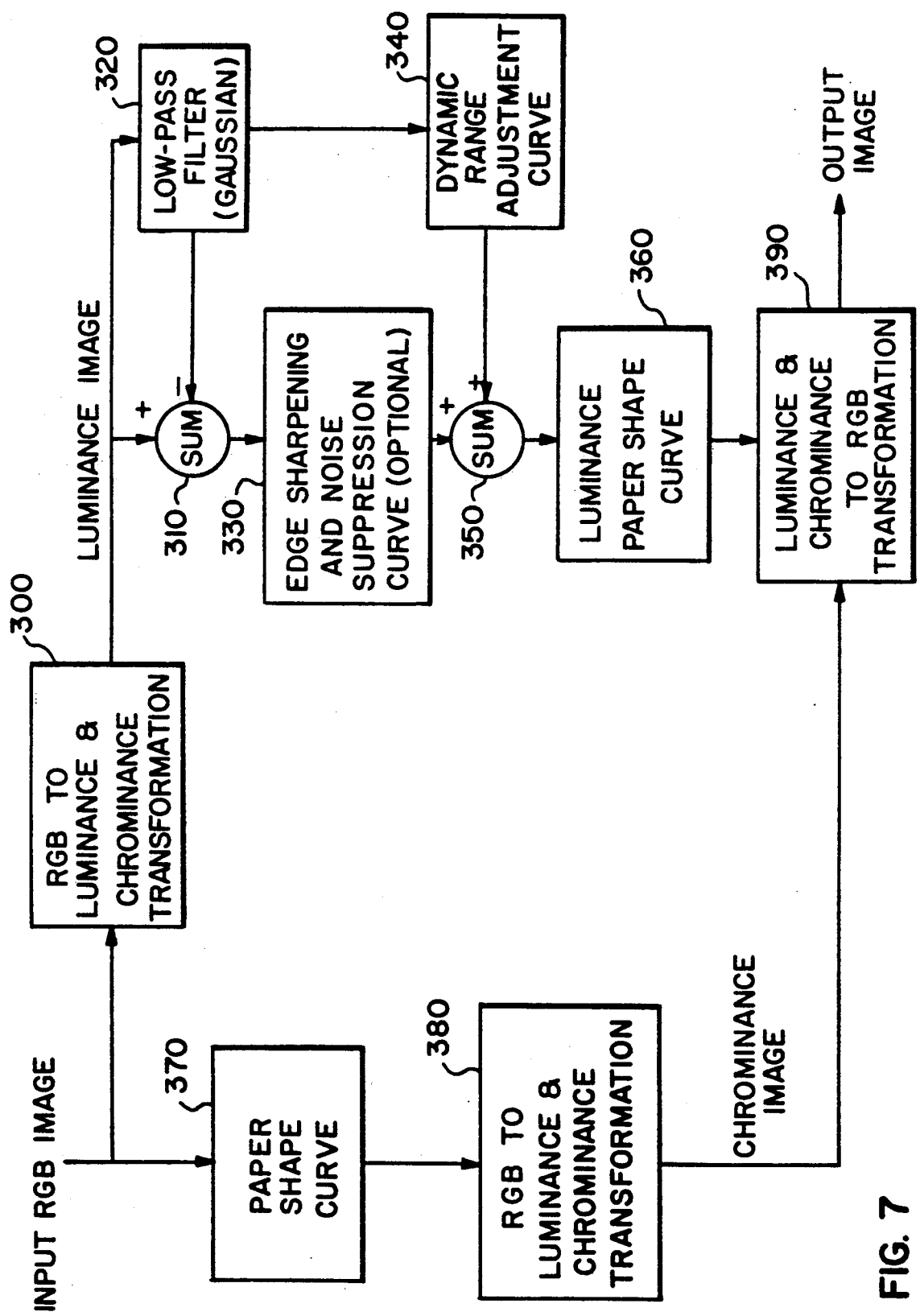
FIG. 7 is a block diagram modification of the block diagram of FIG. 3 illustrating the function blocks of a second embodiment of the invention.

The paper shape curve block 170 can cause non linear effects in the image which result in the chrominance image being altered by the improved luminance image. This alteration may be desired, or it may be unwanted. If it is unwanted, then the processing may be done according to the embodiment illustrated in FIG. 7. In this case, the luminance image is processed the same way as was illustrated in FIG. 3 down through the summing circuit 150 (or 350 in FIG. 7) while the chrominance image receives a different processing which prevents its alteration by the improved luminance image. Referring to FIG. 7 beyond the summing circuit block 350, the luminance image is passed through a luminance paper shape curve block 360. The luminance paper shape curve block 360 functions to modify the luminance signal by the characteristics of the paper upon which the image is to be printed. The input R,G,B image is put through the paper shape curve block 370. This paper shape curve block 370 functions to modify the original chrominance image as carried on the original luminance image by the characteristics of the paper upon which the image is to be printed. The R,G,B signals from the paper shape curve block 370 are then directed to the R,G,B to luminance transformation (matrix) function block 380 wherein signals corresponding to a luminance image and a chrominance image are generated. Only the chrominance image signal appears at the output of block 380. The chrominance image from block 380 and the luminance image from block 360 are recombined in the luminance/chrominance to R,G,B transformation (matrix) block 390. This transformation block 390 recreates the R,G,B image required for the printing device. All of the above may be implemented with the processor 16 operating under software control.

The present invention is concentrated on the manipulation of the curve which is used to modify the low frequency component to achieve the dynamic range adjustment, shown in FIG. 3 as block 140. This curve will be called the dynamic range adjustment curve. The input low frequency component from the low pass filter 120 is mapped through the curve to a density space called the normalized density (see FIG. 6), which means that a density is not only contrast adjusted, but also density balanced in the sense that a fixed normalized density is always mapped to a fixed paper density. In particular, the normalized density of 1.28 is mapped to status A density of 0.8 on the paper.

The main questions for any implementation are what type of weighted average should be used, and how large should its support be. Since a Gaussian filter (or the difference of Gaussians) is often used in psychophysical experiments to fit the shapes of the spatial frequency channels of the human visual system, and since it has a smooth shape (a smooth shape being necessary to avoid ringing artifacts), it is chosen as the low pass filter 120 for this application. The choice of filter size is not so obvious. Two approaches are possible. One is to process the same image through the system with filters of many different sizes, and let a group of people choose from them the best looking one. The other is to choose a filter size which will give a final frequency response similar to the low frequency portion of the human contrast sensitivity function, as described in the previous section.

In the preferred embodiment of the invention, digital images were scanned from 35 mm negatives (36 mm by 24 mm in dimension). They were all of the same size: 1932 by 1308 pixels. For a typical 35 mm camera with a focal length of 50 mm, the angle of view is about 39.6 degrees in 1932 pixels. There are 46.8 pixels per degree at the center. A Gaussian filter with standard deviation $=\sigma$ pixels has a half height response frequency of $0.1874/\sigma$ cycles/pixel. If the half height frequency for the human contrast sensitivity function is 2.25 cycles/degree, which corresponds to 0.0481 cycles/pixel, then a proper size of the Gaussian filter is $\sigma = 0.1874/0.0481 = 3.90$ pixels. This somewhat simplified calculation shows that the best print should be around $\sigma = 4.0$ pixels. Note that one of the goals of the system is to make the print look like the scene as the human visual system sees it. The image processing is therefore trying to duplicate the visual processing that occurs when viewing the original scene, not when viewing the print, and it is the scene viewing condition which is important, not the print viewing condition. Therefore, the above calculated result should be dependent on the film size and the camera focal length, but not too much on the print viewing distance and printer/scanner MTF's (modulation transfer function). Of course, the scanner MTF can affect the frequency content of the scanned image, and can be the dominating factor when it is affecting the spatial frequencies lower than 8 cycles/degree (peak visual sensitivity) in the original scene, or 0.171 cycles/pixel on the scanned image, or 9.2 cycles/mm on the negative. Since a typical 35 mm negative film has an "MTF" of 0.5 at 30 cycles/mm or more, a scanner MTF should have an MTF value almost equal to 1.0 at 9.2 cycles/mm, otherwise the scanned image is probably too blurry to be useful. Although the print viewing distance determines the spatial frequencies of the image features, it seems that as far as tone scale is concerned, the images processed by the system do not change their tone scale quality much, if at all, when viewed at different distances from 5 inches to 20 inches. Some image detail disappears at a large viewing distance, but the tone scale perception is not noticeably affected. Why this is so is not clear, but this observation seems to confirm the above statement that the viewing condition is not very important in determining the filter size. One can only conclude that the brightness perception for a flat surface is relatively independent of spatial frequency.

From the above discussion, the best choice for the filter size is about $\sigma = 4.0$ pixels. However, since the low frequency content of the image is degraded a little compared with the high frequency components, the image tends to look somewhat harsher than the optical. The current implementation has intentionally made it look softer by using a small $\sigma$ of 3.66 pixels, when convolving with the full size image.

An interactive software program called LOFCA (low frequency contrast adjustment) has been implemented on a SUN workstation, (a product of Sun Microsystems Inc.) using C language and the SUNVIEW window package. The software program is set out in full in Appendix A. This section will describe the implementation of LOFCA.

The most time-consuming operation in the algorithm is the Gaussian convolution with a 23 by 23 mask ($3\sigma$ on each side). Although the mask is separable in x and y, it still takes about 6–8 minutes on a SUN4/280 workstation with 32 megabytes of memory to finish a 1932 by 1308 image. It is, therefore, preferable to subsample or block average the original scanned image to reduce the size for the interactive processing. This will affect the judgment of image structure on the monitor screen, but seems to provide adequate images for contrast and tone scale judgment. The input image (1932 by 1308) is 4 by 4 block averaged in film transmittance, reducing the size to 483 by 327 pixels. A luminance image is created from the reduced R,G,B image by the weighting function: luminance $= 3/8R + 4/8G + 1/8B$. The following operations are done by the LOFCA Program on an input image before the monitor screen displays the images for user interaction:

The luminance image is convolved with a 7 by 7 Gaussian filter with $\sigma = 1$ pixel to produce the low-pass image. This takes about 20 seconds on SUN3/260 with 8 megabytes and a floating point accelerator.

A high pass image is also computed by subtracting the low pass image from the luminance image.

Both the low pass and the high pass images are stored in memory as short integers (empirically this has been found to be the fastest data type for arithmetic operations on a SUN3/260).

The low pass image is mapped through the dynamic range adjustment curve (implemented as a look up table 200, see FIG. 4), and then added to a high-pass image. The combined high pass and adjusted low pass image is directed to a paper shape curve (implemented as a look up table 210) to produce the output image which, after going through a screen calibration table 220, is displayed on the monitor 30 for the user to compare with the simulated best optical print.

As soon as the user changes any parameter of the dynamic range adjustment curve, a new look up table 200 is computed. The low pass image is mapped through the new table and added to the high pass image to produce a new output image, which is then displayed. The whole process takes less than half a second, and the monitor image appears to change almost instantly.

When the user decides that the output image is good, he/she selects the "output" button with the mouse 31, and the program writes out the dynamic range adjustment look up table 200, which is used to process the full sized image.

To speed up the processing of many images, one can have it processed in the background while manipulating the contrast of the current image, thus eliminating waiting time.

Figure 5:
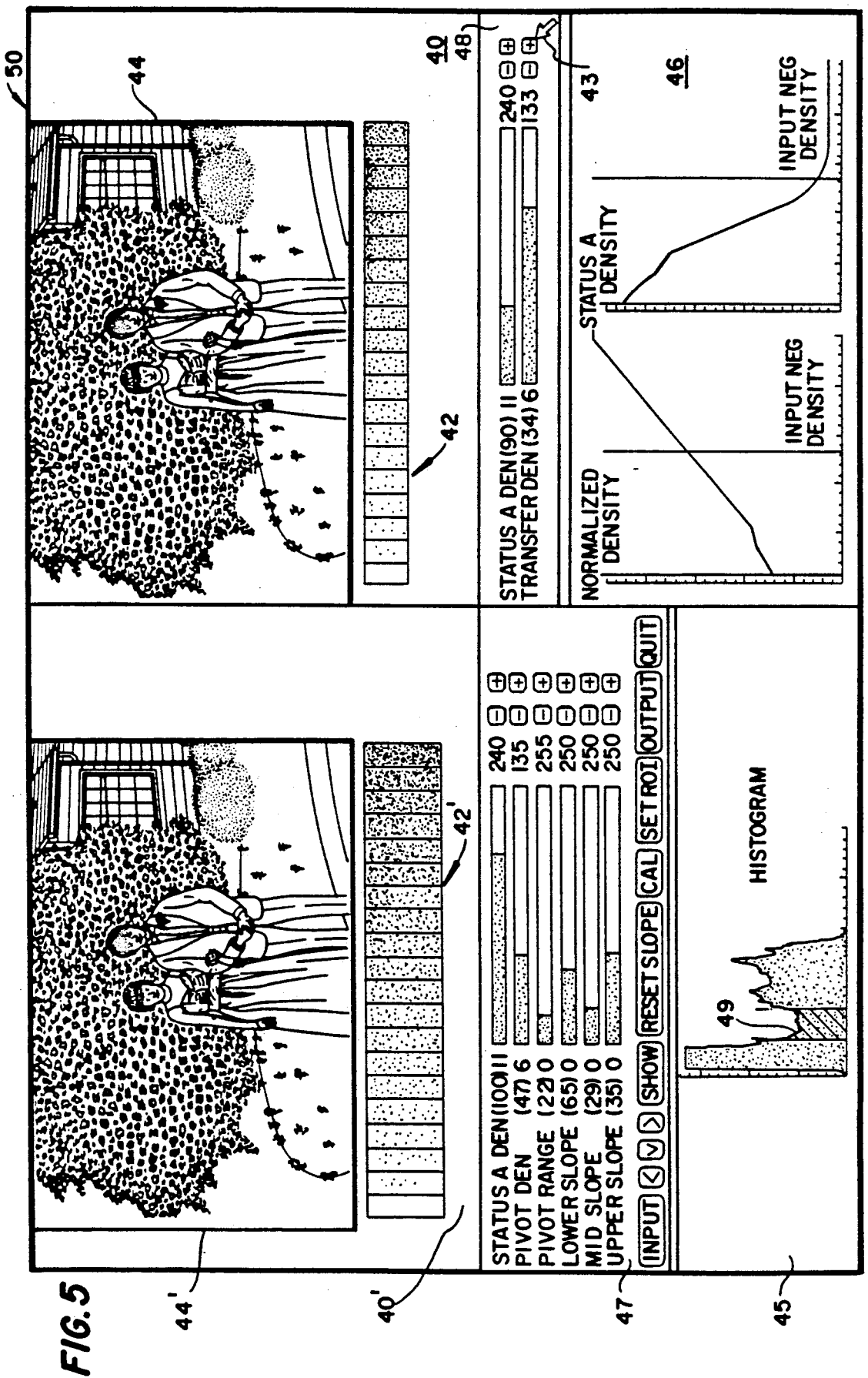
FIG. 5 illustrates the screen of a CRT monitoring device when implementing the present invention at an operating position.

One key component in the user interaction is screen calibration. It is very important to make the image on the monitor screen look like the final print on photographic paper. Otherwise, the user has to mentally correct for the difference when looking at the displayed image on the monitor. The LOFCA Program provides a button for the user to adjust the calibration curve parameters. The calibration curve maps the normalized film density through the paper shape curve 210 and the monitor CRT characteristic function table 220 to the CRT code value, such that the displayed image will have the proper radiance at each pixel location to make it look like a print on paper. The deeper question of the human visual adaptation state when viewing the CRT monitor is not explicitly addressed in the calibration so far. The goal is that if pixel P is to be printed at status A density 0.7 and pixel Q at 1.0, then the CRT screen should display P at twice the radiance as that of Q ($10^{1.0-0.7} \simeq 2$). This only takes care of the physical calibration on a relative scale. The psychophysical calibration is much more involved and the LOFCA Program lets the user adjust two parameters of the calibration curve: the gamma of the CRT and the status A density to be mapped to the CRT code value 128 (shown as a CAL input 254 to look up table 220). With these adjustments, the user must try many images before he/she is preceptually calibrated. Referring to FIG. 5, another help that the LOFCA Program provides is the capability to display, anywhere on the blank area of the image canvases 40 and 40', 20 step gray scales 42 and 42' starting from status A density 0.1 (actually 0.11, because this is the minimum density of the paper used) with an increment of 0.1. The gray scale is specified by clicking any two points outside of the image area, but within the canvas. If the user has difficulty judging the absolute brightness of an area in the processed image, the gray scale helps make the absolute judgment into relative judgment, which is much easier and more reliable. All these features are desirable for compensating for the lack of control over the room lighting, monitor differences, and variations in individuals, perception.

FIG. 5 show the screen 50 when the LOFCA Program is run on a SUN workstation. There are four canvases and two panels: the optical print canvas 40, the output image canvas 40', the histogram canvas 45, the contrast curve canvas 46, the optical control panel 47, and the contrast control panel 48. The optical print canvas 40 displays the simulated optical print 44, and the output image canvas 40' displays the processed image 44'. Both canvases are dimensioned as 512 by 512, and the program will not accept images larger than 512 on either side. The histogram canvas 45 displays the density histogram of the input image. The contrast curve canvas 46 displays the normalized density vs. input negative density curve (see FIG. 6 for details about this curve), as well as the output status A density vs. input negative density curve. These curves have center segments highlighted. They correspond to the middle segment of the dynamic range adjustment curve, specified by the pivot density and the pivot range, explained in more detail later. The corresponding middle region of the histogram is also highlighted.

The convention of the usage of the mouse buttons (shown in FIG. 2) is as follows. The left mouse button A is used to select items and set values. The right mouse button C is used for clearing up the canvases. For example, if the gray scale is not wanted, it can be erased by clicking the right button of the mouse in the canvas you want to clear. The middle mouse button is not used in the current implementation.

The density balance for the simulated optical print is done by adjusting the sliders in the optical control panel 48, which has two sliders: one for status A density, and the other for transfer density (See FIG. 5). On the right hand side of each slider, there are two buttons for incrementing and decrementing — the corresponding slider value by 1, for while coarse adjustments are made directly to the sliders. The negative density shown in the transfer density slider is mapped to the status A density value shown in the status A density slider. The sliders are selectively activated and incremented by the use of a cursor.

The contrast control panel 47 has six sliders and ten buttons. The displayed slider values are the real values multiplied by 100 (e.g, a slope of 0.3 is displayed as 30, and a density of 0.8, 80). Again, on the right hand side of each slider, there are two buttons for incrementing and decrementing the corresponding slider value by 1.

"status A density" slider
"pivot density" slider
"pivot range" slider
"lower slope" slider
"mid slope" slider
"upper slope" slider
"input" button
"<", "−v", and ">" buttons for rotating the images
"SHOW" button
"Reset slope" button
"Cal" button
"SetROI" button
"Output" button
"Quit" output The "input" button will ask the user for the name of the next image to be processed. After the input image name is entered, the program computes the low pass and the high pass images. It takes roughly seconds for the SUN3/260 before the processed image and the simulated optical print are displayed on the monitor screen.

The dynamic range adjustment curve is initialized to be a straight line, which is determined by its slope and one point for density balance. From the paper curve, one can estimate the negative density range which can be printed between 0.12 and 1.8 paper density. This range is called the usable negative density range, and is estimated to be 0.9. The first and the 99th percentile densities of the input image density histogram are called dmin and dmax. The initial slope is estimated to be 0.9/(dmax dmin+0.01) and the initial density balance point is to map (dmin+dmax)/2 to the normalized density 1.28, which is then mapped to status A density 0.8. The initial estimated slope value is limited to be less than 1.26 and greater than 0.65. These two limits were empirically determined after printing many images. In general, if the slope value exceeds this range, the image tends to look artificial. These initial estimates frequently need no further interactive adjustments.

Figure 6:
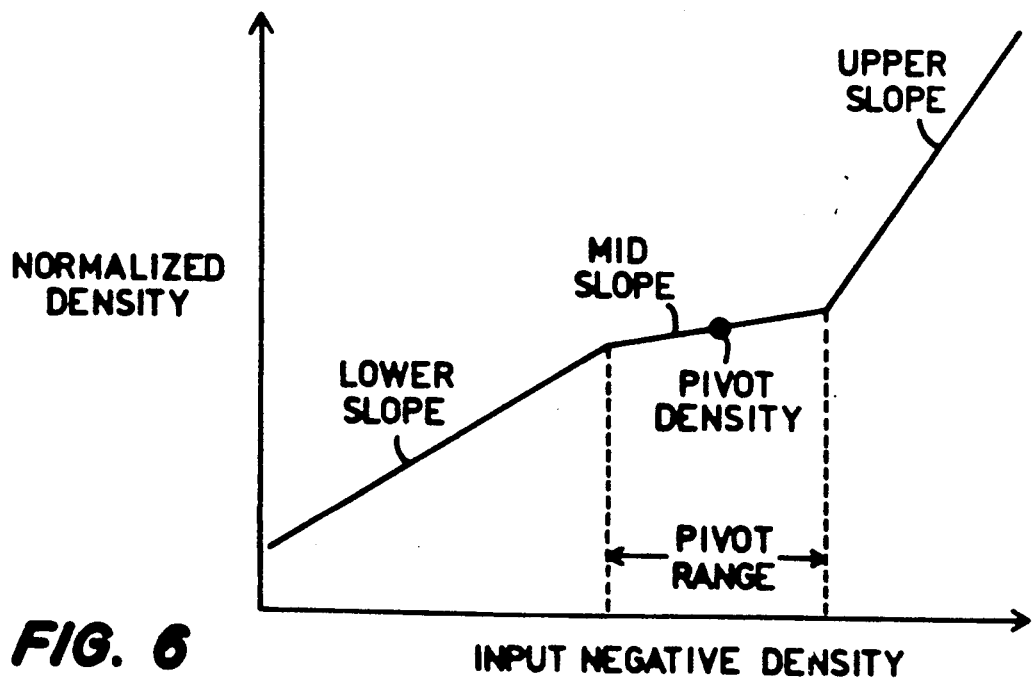
FIG. 6 illustrates an example of a dynamic range adjustment curve generated by the present invention.
Figure 4:
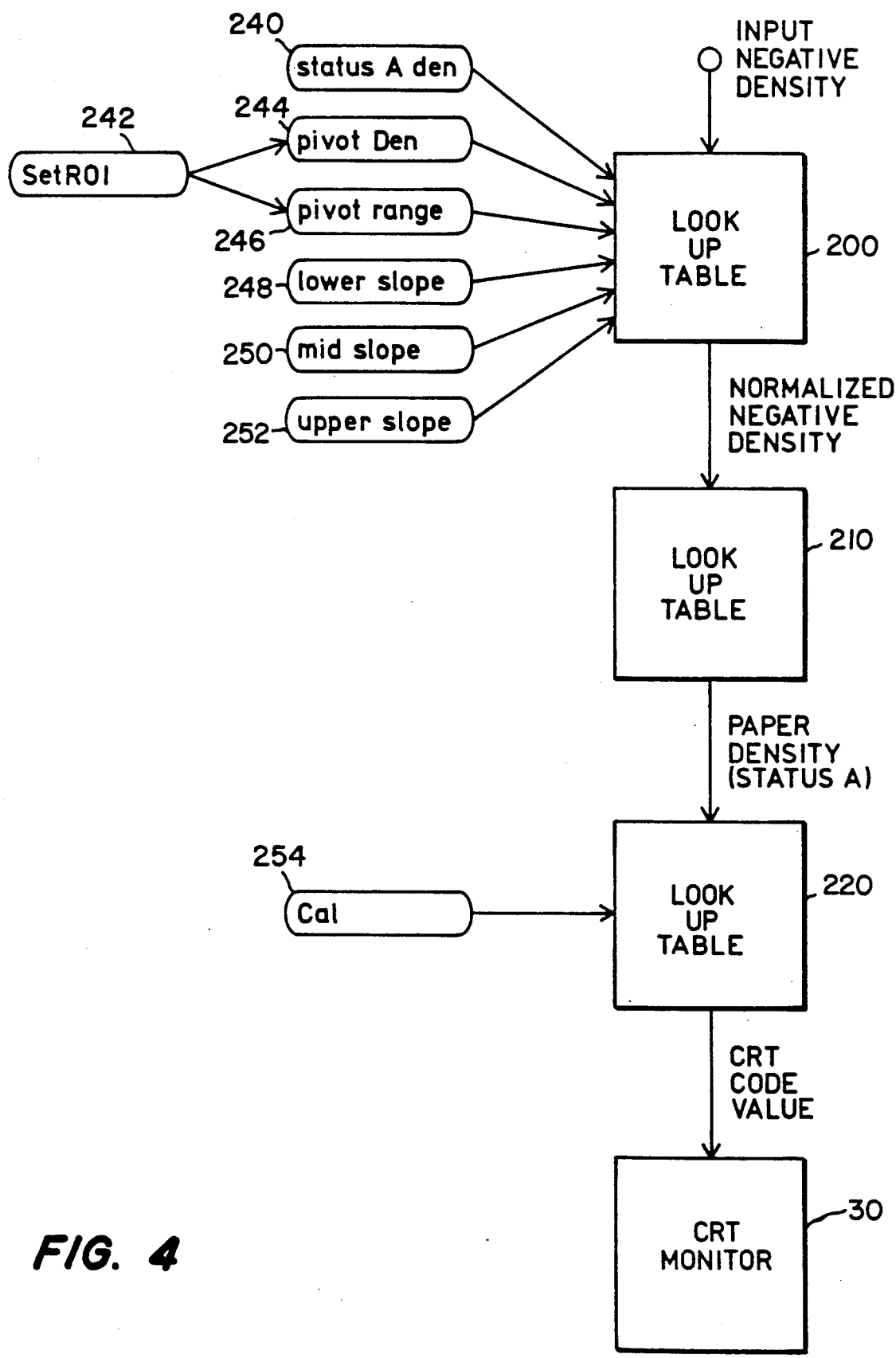
FIG. 4 is a block diagram illustrating the mapping of the low-frequency component of an input negative density to a CRT code value.

Referring now to FIG. 6 and FIG. 4, the dynamic range adjustment curve is a piecewise linear curve, usually having three segments. The middle segment is determined by its slope and center point. The slope is controlled by the "mid slope" slider 250, and the center point is controlled by the "pivot density" slider 244 and the "status A density" slider 240. The length of the middle segment is controlled by the "pivot range" slider 246. The upper and the lower segments are always connected to the end points of the middle segment, and thus have only one degree of freedom. The user can change the slopes of the upper and the lower segments by moving the "upper slope" and "lower slope" sliders 252 and 248, respectively.

The rotation buttons "<", "v", and ">" are used for rotating the images on the screen. The arrows indicate the current direction of the top of the image. For example, if the currently displayed image is upside down, the "v" button should be used to bring it right side up.

The "SHOW" button allows the user to display the locations of the pixels which have density values within a specified range. The range can be specified either of two ways. The first way is to use the "pivot density" and the "pivot range" sliders 244 and 246, respectively. The second way is to move the cursor to the histogram canvas 45 and use the mouse 31 to click the beginning and the end densities to specify the range. The pixels within the range will show up on the optical print canvas 40 as white, and the rest as black. The "SHOW" button is a toggle switch which allows the user to alternate between the simulated optical print 44' and the pixel locations. The use of the histogram canvas 45 and the pixel location image is the most effective way to determine which areas of the input image 44 have certain specified densities. One example is for printing a flash in the face scene. The histogram is usually bimodal. The user can use the mouse 31 to specify the density range around a histogram valley 49 and use the "SHOW" button to see if those pixels all fall on the boundaries of objects. If yes, one can compress that density range quite freely without worrying too much about possible artifacts (but not below 0.3).

The "Reset slope" button is useful when the user has gone too far in changing the slope values. The button will bring all the slope values to the initial values estimated by the program. The "Cal" button 254 will prompt the user in a dialog mode for changing the CRT gamma and the status A density to be mapped to CRT code value 128, to adjust the monitor calibration. The "SetROI" button 242 is another way to specify the middle segment of the dynamic range adjustment curve one can move the cursor 43 to the histogram canvas 45 and specify the two end points of the middle segment. One then hits the "SetROI" button 242 to change the pivot density and the pivot range to that specified in the histogram canvas 45. In doing so, the LOFCA Program tries to maintain roughly the same density balance by estimating what new status A density the new pivot density should be mapped to.

When the user is done with the current image, he/she selects the "output" button to specify the file name where all the parameters are to be stored. The "Quit" button terminates the program immediately.

One final feature applies to both of the image canvases. If the cursor 43 is moved to the image area and the left button A of the mouse 31 is clicked, the program will take a 5 by 5 average of the input densities centered at the location where the cursor 43 points, and print out the value as well as the (x,y) coordinates and the status A density to which the average value is mapped. If the cursor is in the output image area, the averaged value is also marked in the histogram canvas, so that the user can see where in the histogram that density falls relative to the whole image.

In FIG. 7, there is illustrated, n block diagram form, a variant on the embodiment of the invention that is illustrated in FIG. 3. Specifically, in FIG. 7 there is provided a paper shape curve block 370, positioned in the chrominance image path, as well as a luminance paper shape curve block 360 positioned in the luminance image path. The input RGB image is directed to block 370 and to block 300. The luminance image signal from block 300 is directed to the positive input of a summing device 310 and to the input of a low-pass (gaussian) filter 320. The summing device also receives on its negative input and output from the low-pass filter 320. The summing device performs the arithmetic summation of the input numbers and directs the sum to the edge sharpening and noise suppression block 30. The low-pass filter 320 reduces the amplitude of the high frequency component of the in-coming signal while letting the low frequency component pass through without much reduction in amplitude. The dynamic range adjustment curve 340 receives the output of the filter 320 and operates to adjust the density range of the low frequency component of the input luminance signal. It is implemented as a piece-wise-linear curve with three segments. The parameters of each segment are adjusted interactively by the user, looking at the density histogram of the image, selecting the density range for compression or expansion by verifying the affected image regions using the set SHOW button, and comparing the processed image with the non-processed one side-by-side on the monitor screen. The summing device 350 is similar in function to the summing device 310 and provides its summed output to the luminance paper shape curve block 360. The luminance and chrominance to RGB transformation block 390 is similar in function to the block 160, illustrated in FIG. 3.

Although the invention has been described and illustrated in detail, it is to be understood that the same is by way of illustration and example only and is not to be taken by way of limitation, the spirit and scope of this invention being limited only by the term of the appended claims.

We claim:

1. An interactive dynamic range adjustment method for digital images comprising the steps of:
   (a) converting an R,G,B digital image signal into luminance image signals;
   (b) low pass filtering the luminance image signals to provide low frequency component luminance image signals;
   (c) subtracting the low frequency component luminance image signals from the luminance image signals to provide high frequency component luminance image signals;
   (d) modifying, interactively, the low frequency components of the luminance image signals by mapping through a mapping curve to a density space;
   (e) recombining the modified low frequency and high frequency components of the luminance image signals of steps (c) and (d);
   (f) mapping the recombined modified low and high frequency components of the luminance image signals of (e) through a paper shape curve;
   (g) mapping an R,G,B digital image signals of step (a) through a paper shape curve;
   (h) transforming the mapped R,G,B signals of step (g) into chrominance image signals;
   (i) combining the luminance image signals of step (f) and the chrominance image signals of step (h); and
   (j) transforming the combined signals from (i) to R,G,B image signals to provide an interactively adjusted digital image.

2. The interactive dynamic range adjustment method for digital images according to claim 1 wherein step (d) modifies the separated low frequency components by contrast adjustment and density balance.

3. The interactive dynamic range adjustment method for digital images according to claim 1 and further comprising:
   displaying the original digital image;
   displaying the digital image corresponding to the interactively adjusted digital image signal, and
   displaying the mapping curve of step (d).

4. The interactive dynamic range adjustment method for digital images according to claim 3 wherein the displayed mapping curve is a piecewise linear curve having three segments, a lower slope, mid-slope and upper slope with the ends of the mid-slope segment having one end connected to an end of the lower slope segment and its other end connected to an end of the upper slope segment.

5. The interactive dynamic range adjustment method for digital images according to claim 1 and further comprising the steps of:
   displaying the density histogram of the original digital image; and
   displaying interactive values for operator modification.

6. The interactive dynamic range adjustment method for digital images according to claim 1 and further comprising the step of modifying the interactive adjusted digital image by a display device curve to display the interactive adjusted digital image as it will be printed on paper.

7. The interactive dynamic range adjustment system for digital images according to claim 5 and further comprising:
   selecting a range of density values from the displayed histogram defining a valley; and
   determining if the pixels associated with the valley defining density values all fall on boundaries of the objects in the original image, if so, then operating to compress the valley defined density range.

* * * * *

UNITED STATES PATENT AND TRADEMARK OFFICE
CERTIFICATE OF CORRECTION

PATENT NO. : 5,012,333
DATED : April 30, 1991
INVENTOR(S) : Hsien-Che Lee, et al It is certified that error appears in the above-identified patent and that said Letters Patent is hereby corrected as shown below:

Column 1, line 9, delete "rings" and insert --range--.

Column 9, line 24, delete "individuals," and insert --individuals'--.

Column 9, line 59, after "incrementing" insert --+--.

Column 9, line 60, after "for" insert --fine adjustment--.

Column 10, line 11, delete "-v" and insert --"v"--.

Column 10, line 33, after "dmax" insert -- - --.

Column 11, lines 24-25, delete "curve one" and insert --curve.  One--.

Column 11, line 48, delete "n" and insert --in--.

Column 11, line 62, delete "30" and insert --330--.

Column 12, line 19, delete "term" and insert --terms--.

Column 14, line 3, delete "system" and insert --method--.

Column 14, line 6, after "comprising" insert --the steps of--.

Signed and Sealed this

Seventeenth Day of November, 1992

*Attest:*

DOUGLAS B. COMER

*Attesting Officer*  *Acting Commissioner of Patents and Trademarks*